Aug. 17, 1965       A. A. HAYATIAN                3,201,134
                  BEARING SEAL STRUCTURE
Filed Dec. 31, 1962                           2 Sheets-Sheet 1
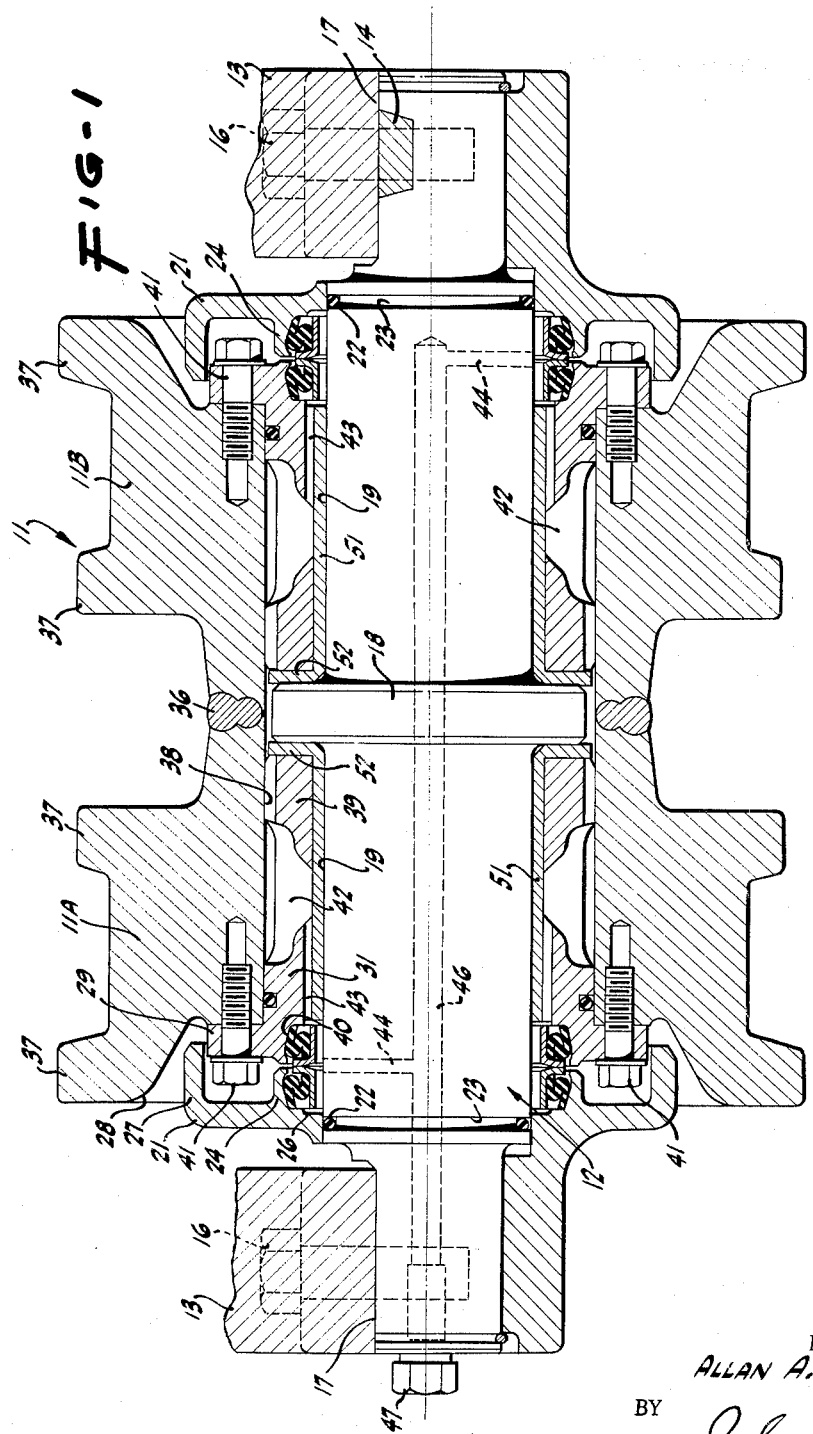
INVENTOR.
ALLAN A. HAYATIAN
BY
Julian Caplan
ATTORNEY Aug. 17, 1965
A. A. HAYATIAN
3,201,134
BEARING SEAL STRUCTURE
Filed Dec. 31, 1962
2 Sheets-Sheet 2
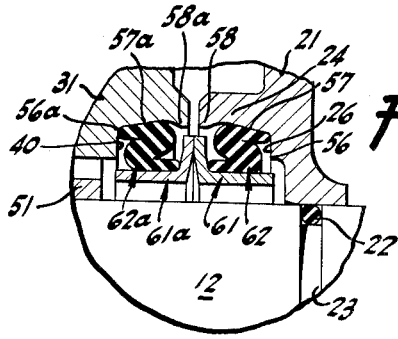
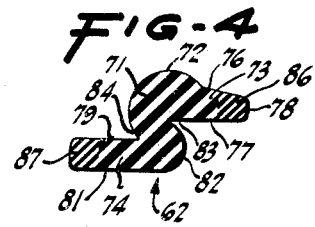
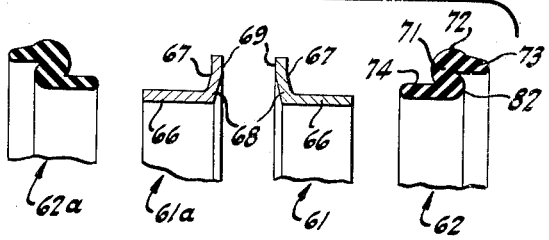
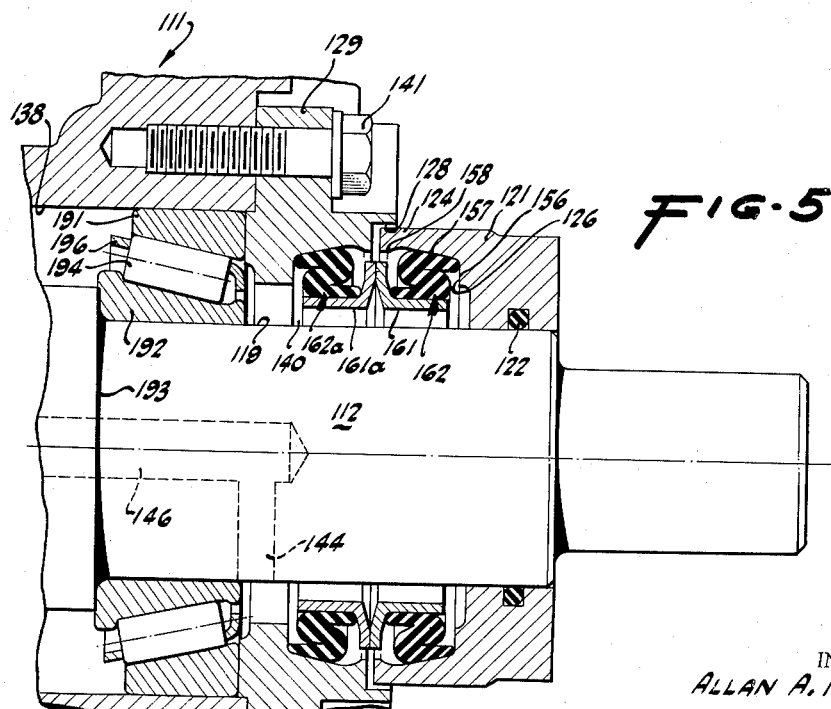
INVENTOR.
ALLAN A. HAYATIAN
BY
ATTORNEY United States Patent Office 3,201,134
Patented Aug. 17, 1965

3,201,134
BEARING SEAL STRUCTURE
Allan A. Hayatian, Lomita, Calif., assignor to Westrac Company, Torrance, Calif.
Filed Dec. 31, 1962, Ser. No. 248,780
15 Claims. (Cl. 277—92)

This invention relates to a new and improved bearing seal structure. This applicaton is a continuation-in-part of my copending applications Serial Nos. 156,031, now abandoned, filed November 30, 1961, and 193,900, now abandoned, filed May 4, 1962.

A particular environment for the use of the present invention is in sealing the bearings of the track roller of crawler tractors, an installation wherein the bearing seals are of vital importance to protection of the bearing and wherein the forces and conditions to which the seals are subjected are extremely severe. A conventional crawler type tractor has on either side thereof a substantially horizontal track rail which supports the weight of the tractor. Substantially horizontal shafts interconnect portions of the rail and are stationarily secured thereto. Rotatable about each shaft is a roller which is supported by the crawler track. Interposed between shaft and roller is a bearing which is suitably lubricated. Sealing the bearing against egress of lubricant and ingress of water, mud, rock and other contaminants which might destroy the bearing, is the principal object of the present invention.

It will be understood that track rollers and their supporting shafts are subject to unusually severe forces as the tractor moves over uneven ground and moves heavy loads. In the first place, the weight of tractors and the loads which they push or pull are very heavy. Further, the loads are unevenly applied in that a major portion of the load may be borne first by the rollers on one side of the tractor and then the other, or by the rollers at the front and then at the rear of the tractor and by reason of slippage of the track, terrain and other factors the effective load may increase and diminish repeatedly. Still further, end thrust may be applied alternately from either axial direction intermittently. Additionally, the parts of the roller bearing tend to wear with the passage of time, setting up new conditions as contrasted with those when the bearing surfaces are new. These and other factors are among the most severe operating conditions under which bearings may be called upon to perform.

The present invention provides a seal preventing leakage of lubricant from the bearing which maintains the seals substantially intact under all of the foregoing severe operating conditions.

The ground over which the tractor operates is also a severe test for the seal of the bearings. Thus crawler tractors traverse ground covered with layers of water and mud. Additionally, such tractors may traverse areas where rock and gravel create an atmosphere of rock and gravel dust or where sand and silt tend to penetrate through the bearing seal and into the bearing. A seal which will effectively withstand penetration of these contaminants is essential to preservation of the life of the bearing. The present invention provides a seal which will effectively protect the bearing against entry of such material.

The seal which is the subject of this invention is of the type known as a metal-to-metal seal wherein two contacting metal flanges are turned relative to each other, the interface of the seal being very accurately lapped. It is essential that means be provided to maintain the sealing flanges in contact with each other, both initially and after they wear with the passing of time, and to maintain such contact against the ingress of the contaminants heretofore mentioned despite the severe stresses tending to separate the interface under operating conditions. In addition, means is provided in accordance with this invention for sealing one metal flange to the roller and the other metal flange to the shaft to prevent leakage of contaminants around the interface. It is an important feature and advantage of the present invention that resilient means is provided which functions both to bias the interface into close sealing contact and at the same time seals the metal flange members to the surrounding structure of either the shaft or roller.

The present invention relates to improved sealing means and techniques and is particularly useful where it is desired to seal the space between two relatively rotating parts which may serve as a housing for either a rotating or non-rotating shaft.

In general, the arrangement as described herein involves a rotating part and a non-rotating part that serve as a housing within which a pair of metal flanged ring-shaped sealing members have abutting lapped surfaces and are floatingly maintained in the housing with such surfaces maintained in abutment by a pair of specially formed elastic or resilient sealing rings that cooperate with the housing and metal ring-shaped sealing rings in a special manner.

It is therefore an object of the present invention to provide a new sealing structure as indicated above.

Another object of the present invention is to provide an improved sealing structure between rotating parts.

Another object of the present invention is to provide an improved sealing arrangement which is efficient, light in weight and simple and compact, using a relatively small number of parts.

Another object of the present invention is to provide a sealing structure of this character wherein the component parts are few in number and allow themselves to be made inexpensively but with precision.

Another object of the present invention is to provide an improved sealing structure characterized by the fact that the same may be assembled without special instructions and without special tools.

A still further object of the present invention is to provide a seal comprising a pair of metal flanged ring-shaped sealing members having abutting lapped surfaces which are floatingly maintained in abutment by a pair of specially formed elastic or resilient sealing rings, the peripheral portions of which are harder than the central portions thereof.

Other objects of the present invention will become apparent upon reading the following specification and referring to the accompanying drawings in which similar characters of reference represent corresponding parts in each of the several views.

In the drawings:

FIG. 1 is a longitudinal sectional view through a crawler type track roller, its shaft and associated structure showing the present invention installed therein.

FIG. 2 is an enlarged fragmentary sectional view of a portion of the structure of FIG. 1 showing the seal.

FIG. 3 is an exploded fragmentary sectional view showing portions of the seal.

FIG. 4 is an enlarged cross section of the rubber seal ring.

FIG. 5 is a fragmentary view similar to FIG. 1 showing the invention installed in a modified bearing structure.

A typical crawler type tractor roller 11, roller shaft 12 and associated mechanism is shown in FIG. 1. A plurality of flanged rollers 11 having horizontal transverse axes of revolution are spaced longitudinally on either side of the machine. Such rollers roll upon the continuous tracks (not shown) on either side of the machine which are characteristic of crawler-type tractors. Each roller 11 is supported by an individual stationarily mounted roller shaft 12. Each end of the roller shaft 12 is secured to and mounted below a portion of a horizontal longitudinally extending track rail 13, there being one such rail on each side of the machine. Portions only of the rail 13 are shown in FIG. 1, said portions being downward extensions from a superimposed connecting structure (not shown) and being keyed to shaft 12 by means of lock keys 14 and secured thereto by means of mounting bolts 16. The weight of the tractor itself is distributed on the track rails 13 and hence is transmitted to shafts 12 and thence to rollers 11.

Each shaft 12 is formed with a horizontal flat surface 17 on the top which is a mounting surface for the rail and is further formed with a recess for lock key 14. Centrally of shaft 12 is an enlarged thrust collar 18 which accommodates endwise thrust of roller 11 relative to shaft 12, and on either side of collar 18 is an elongated, cyclindrical, very smooth bearing surface 19. An end collar 21 is carried at either end of shaft 12 and seals thereto by means of O-ring 22 in groove 23 in shaft 12. Collar 21 has a central hub 24 which fits around the end of cylindrical portion 19 and is formed with recess 26 which is hereinafter described. Collar 21 is also formed with an inwardly-turned outer flange 27 which fits into annular recess 28 in roller 11 and also around peripheral end flange 29 of bushing 31 with a fairly close fit to prevent ingress of large foreign material such as gravel, rocks, etc., between collar 21 and roller 11.

Roller 11 shown in FIG. 1 is conventionally formed of two halves 11A, 11B welded together by means of weld 36 along the center and has peripheral flanges 37 which mate with complementary portions of the track shoes to hold the track in alignment with the tractor. Fitting within central bore 38 of roller 11 on either side of thrust collar 18 is bushing 39 which has radially protruding peripheral flange 29 and is secured to roller 11 by means of a plurality of screws 41. The outward facing end of each bushing 31 is formed with recess 40 which is opposed to recess 26 in end collar 21 and is exactly the same in shape. Bushing 39 is preferably cut away as indicated by reference numeral 42 to provide a reservoir for lubricant. Axial glands 43 intercommunicate between reservoir 42 and radial ducts 44 in shaft 12.

For purpose of adding lubricant, longitudinally extending lubricating duct 46 may be drilled through the center of shaft 11 from the outer end thereof, the entrance to duct 46 being closed off by means of a cap 47 between lubrications. Radial secondary ducts 44 extend from central duct 46 at either end of the roller to carry lubricant to the bearings. The maintenance of proper lubrication of the bearing surfaces 19 is of extreme importance particularly under the severe operating conditions to which track rollers are subjected. Further, reservoir 42 is maintained with lubricant through glands 43.

One preferred bearing shown in FIG. 1 has bronze, sleeve-type extended cylindrical portions 51 on either side of collar 18 interposed between bushing 39 and cylindrical surface 19 of shaft 12 and having an annular outturned thrust flange 52 between the inner end of bushing 39 and collar 18. Thus the bearing assumes both radial and longitudinal forces relative to roller 11 and shaft 12.

The construction of roller 11, roller shaft 12 and bearing 51 heretofore described is more or less conventional and is subject to considerable variation. A particular feature of the invention is provision of means for sealing lubricant between bearing surfaces 19 and sleeve 51 and sealing against ingress of foreign contaminants. Directing attention first to enlarged FIG. 2 it will be seen that recess 26 has a radial, annular outer shoulder 56, an inwardly directed but outwardly diverging conical surface 57 and an inwardly turned nose 58. Similarly, recess 40 has an inner radial shoulder 56a, a conical outwardly diverging surface 57a and an inwardly turned nose 58a. Within recess 26 is one metal seal member 61 and one resilient seal member 62, while within recess 40 is one metal seal member 61a and resilient seal member 62a. Rings 61, 61a and seals 62, 62a are identical.

Each ring 61 is fabricated of a special steel alloy hardened by heat processing to be extremely wear resistant, has a short cylindrical portion 66 of inside diameter larger than the outside diameter of shaft 12 so that ring 61 may float relative thereto both radially and axially. A flange 67 is formed on one end of cylindrical portion 66, flange 67 having a conical surface 68 which, particularly with passage of time, terminates in an outer radial flat surface 69 which mates with the corresponding surface of the opposite ring. The mating surfaces 69 are lapped so that they fit in an interface which is in extremely close contact. Hence as the rings 61, 61a rotate relative to each other, a precise seal is maintained. The seal between the two flanges is such that fluids, greases, gases and the like are prevented from either leaving or entering the interior of the housing.

As a means of maintaining the metal sealing members 61, 61a in contact, there is provided a pair of specially shaped interchangeable resilient or elastic seal rings 62, 62a which may be made of rubber or a substitute for rubber. Referring to FIG. 4, which shows ring 62 in its relaxed or unstressed condition, the midsection 71 of the ring is a complex, curved shape having an outer curved surface 72 which is a circular arc of about 180° having its ends diametrically opposed about a diameter slanted at 45°. Projecting outward from midsection 71 is an outer sleeve-like section 73 and projecting in the opposite direction is an inner, sleeve-like section 74. The outer surface 76 of the outer sleeve 73 tapers to meet the inner cylindrical surface 77 with a rounded nose 78 at the end. Inner sleeve 74 has substantially cylindrical inner and outer surfaces 79, 81 which join the underside 77 of outer cylinder 73 in a curved portion 82 which is also a circular arc of about 180° but of lesser radius than arc 72. A relatively deep cleft 83 extends inward from the underside of cylinder 73 and a lesser cleft 84 extends inward from the top of cylinder 74. Thus the cross-section of the seal 62 may be termed a "Double Q" or a "Lazy S" shape in unstressed condition. In a preferred embodiment of the invention the tips 86 and 87 of sleeves 73 and 74, respectively have a hardness substantially greater than that of midsection 71. Increasing hardness of tips 86, 87 results in a structure which has a highly desirable resiliency and is more resistant to wear and is unexpectedly substantially equivalent with respect to sealing properties to the seal without relatively hard tips.

The hard tips may be produced economically by molding two relatively hard resilient rings which form the tips and separately forming a softer resilient central portion and then bonding the tips to the central portion by vulcanizing. The hard tip portions may have a Shore Hardness of about 95 and the central portion a Shore Hardness of about 50, the general range of the tips being between 90 and 100 Shore Hardness and the central portion 40 to 60 Shore Hardness. It is desirable that the material of which the tips and central portion are fabricated be of the same nature, e.g. rubber but composite seal rings made of different materials in the various sections may be used.

In the stressed or assembled condition of the structure, as shown in FIG. 2, the ring is squeezed between the flange 67 metal ring 61 and shoulder 56 or 56a of the recess in which it is received. Such squeezing shortens the axial length of the ring, causing surface 72 to spread radially outward and surface 82 similarly to spread inward. Outer surface 72 abuts the conical surface 57, 57a of recess 40, 56. Upon spreading of section 71 the inner surfaces 82 and 81 are forced against the outer surface of the sleeve portion 66 of metal ring 61. The tips 86, 87 are, by reason of space limitations within the recess, pushed toward each other in direction parallel to the axis of the seal ring and this squeezing of the ring causes a torsional deformation of the central or softer portion 71 of the seal ring as well as a radial outward and inward deformation thereof. Because of the resiliency of the central portion of the seal ring the deformation is resisted and this resistance has several beneficial results. In the first place, the radial deformation of the central portion 71 tends to maintain the metal seal ring centrally aligned with respect to the recess in which it is mounted. In addition, such radial deformation causes a tight seal between the outer surface 72 of the ring and the conical surface 57 of the recess and a similar tight seal between the inner surfaces 81, 82 of the ring and the metal ring, such seals being maintained circumferentially and the combined effect of the two seals is, for practical purposes, to seal the metal ring 61 to the housing in which it is located against ingress or egress of moisture and foreign contaminants. At the same time, the torsional deformation of the rubber rings 62 causes each metal ring 61 to be moved in an axial direction away from its housing or, in practical effect, into tight contact with the mating metal ring, thereby tightly forcing the two metal flanges 69 into contact with each other to secure a metal-to-metal seal. It will thus be seen that the resilient rings 62 maintain a constant load on the metal rings 61 and also permit a floating action of the seal rings 61 to assimilate radial shock, end thrust, and excessive end play while at the same time accomplishing great sealing efficiency under severe operating conditions.

The abutting surfaces 69 of the metal rings are preferably very smooth, being plane-lapped and preferably of small surface area accomplished by tapering the planed portions 68 to generally reduce frictional forces between the same while providing a good running seal therebetween. Each of the tapered portions 68 makes an angle in the range of 2° to 2½° with respect to the plane abutting surfaces 69 of the metal ring. As initially manufactured the plane abutting surfaces 69 of the rings are relatively small in cross sectional area, but, in use, as the surfaces wear, they gradually enlarge as the result of the configuration created by the tapered portion.

The metal seal rings 61 float on the elastic sealing elements 62 and a spring action is accomplished by applying compressive pressures on the rings 62 depressing the ends or legs of the seal to accomplish a reverse or scissors-type motion which produces a rotary torque for tightening the midsection 71 of the seal against the walls of the housing and the cylindrical walls of the metal ring. The higher the difference in pressure between the inside and the outside of the housing the greater the sealing effectiveness.

In use, the roller 11, bushings 39, bearing sleeves 51 and shaft 12 are assembled as shown in FIG. 1. The resilient seals 62, 62a slip around the metal seal rings 61, 61a. Thereupon the inner metal and resilient rings 61a, 62a are slipped into recess 40 in the end of bushing 31 and the outer metal and rubber seal rings 61, 62 are slipped into recess 26 in end collar 21. End collars 21 are then applied which causes the abutting surfaces 69 of the metal seal rings to mate and, as the end collars are drawn into place the seal rings 62 deform from the relaxed position shown in FIGS. 3 and 4 to the stressed position shown in FIG. 2, thereby effectively sealing the metal rings 61, 61a against each other with a running fit and sealing the metal rings to their respective housings. Lubricant is then forced into the bearing structure by removing cap 47 and pumping in lubricant (preferably a lubricating oil) which fills the reservoir 42 and the hollow 46 in the shaft.

Operation of the tractor causes roller 11 to revolve relative to stationary shaft 12. The resilient seal ring 62a causes metal seal ring 61a to revolve with roller 11 while the outer seal ring 62 causes the outer metal ring 61 to remain stationary with shaft 12. However, excessive shock or stress may be accommodated by slight relative movement of one of the metal rings 61 or 61a with respect to its housing.

As has been previously stated, the resilient rings 62 cause the metal rings 61 to seal against each other and also to be sealed with respect to their respective housings. The metal rings 61 float, being biased substantially concentric with the axis of shaft 12, but under severe stresses eccentricity may be accommodated. Further, the flanges 69 of the metal seal rings are maintained in contact so that the position of the rings as shown in FIG. 1 is maintained, but where there are excessive end thrusts the metal rings may move in an axial direction, it being noted that there are slight clearances at each end of cylinders 66 to accommodate such movement.

Directing attention now to FIG. 5 it will be seen that the structure thereof is essentially the same as that shown in FIG. 1 and corresponding parts have been provided with the same reference numerals increased by 100. The bearing between the roller 111 and its shaft 112 in the case of FIG. 5 is a tapered roller bearing wherein the outer race 191 fits in the central bore 138 of roller 111 and is held in place by a bearing retaining collar 129 bolted by means of bolts 141 to roller 111. The inner race 192 at its inner end abuts shoulder 193 on shaft 112 and a plurality of rollers 194 is interposed between races 191, 192, the rollers being spaced apart by means of spacer rings 196. It will be seen that the resilient seal rings 162 and metal seal rings 161 are essentially the same as in FIG. 5 as the corresponding elements in FIG. 1 and function in similar manner.

The foregoing description has been confined primarily to description of the instant sealing means in the environment of a track roller bearing seal. It will be understood, however, that use of the invention is not necessarily so confined and that the structure may be incorporated to seal other relatively rotative parts against escape of lubricant or other fluid or ingress of external contaminants.

Although the foregoing invention has been described in some detail, by way of illustration and example for purposes of clarity of understanding, it is understood that certain changes and modifications may be practiced within the spirit of the invention and scope of the appended claims.

What is claimed is:

1. In a seal construction, a shaft, a rotatable member mounted for rotation about said shaft, said rotatable member formed with a first annular recess adjacent one end of said member, a cap on said shaft at said end of said member, said cap formed with a second annular recess directly opposite and facing said first recess, each said recess having an inner shoulder and an outward-diverging conical surface outward of said shoulder, a first metal ring at least partially disposed in said first recess, a second metal ring at least partially disposed in said second recess, said metal rings each having a cylindrical portion encompassing said shaft and of greater diameter than said shaft and an abruptly outwardly projecting flange on one end of said cylindrical portion, the flanges of said metal rings being in intimate metal-to-metal sealing contact, a first resilient ring disposed around said cylindrical portion of said first metal ring and disposed in said first recess, a second resilient ring disposed around said cylindrical portion of said second metal ring and disposed in said second recess, each said resilient ring being stressed in assembled position and shaped with a resilient midsection of relatively large cross section, each said resilient ring having a large diameter outer cylindrical portion integrally joined to said midsection and extending outwardly from said midsection in a first axial direction and in sealing contact with said conical surface of the recess in which said resilient ring is located and terminating in a tip bearing against said shoulder, each said resilient ring having a small diameter inner cylindrical portion integrally joined with said midsection and projecting in an axially outward direction from said midsection opposite said outer cylindrical portion and sealing against the outside of said cylindrical portion of said metal ring and terminating in a tip bearing against the flange of the metal ring about which said resilient ring is disposed, said resilient rings urging said flanges into contact and floatingly mounting said metal rings approximately centrally relative to said shaft, said resilient ring disassembled being longer in an axial direction than the distance between said flange and said shoulder in assembled position.

2. A seal construction according to claim 1 in which said midsection is torsionally deformed by opposite compression of said cylindrical portions of said sealing ring toward said midsection in the assembled position of said construction.

3. A seal construction according to claim 1 in which at least one said tip is substantially harder than said midsection.

4. In a sealing arrangement of the character described a pair of relatively rotating housing parts which are spaced to define a space which is desired to be sealed, said housing parts each having an annular inner recessed portion defined in part by an inwardly extending tapered surface, a pair of sealing rings having contacting sealing surfaces and providing a running fit, a pair of ring-shaped elastic sealing elements disposed correspondingly between a corresponding housing part and a corresponding one of said rings, each of said elastic sealing elements being generally annular and having two oppositely extending integrally formed leg portions, each extending parallel to the central axis of said sealing element, one of said leg portions being on the outer portion and contacting the corresponding one of said tapered walls with the other leg portion contacting a corresponding one of said ring-shaped elements, said leg portions extending outwardly of said sealing elements in opposite directions in disassembled position of said sealing elements a distance greater than the distance in assembled position between said tapered wall and said ring-shaped element and being compressed therebetween in assembled position to floatingly support said rings and to maintain pressure between said contacting surfaces of said rings.

5. An arrangement as set forth in claim 4 in which each of said rings is a flanged ring and each having a cylindrical portion contacted by a corresponding one of said elastic sealing elements.

6. In a sealing structure of the character described a pair of housing parts separated by a gap which is desired to be sealed, each of said housing parts being provided with a recessed portion being defined by an inwardly extending tapered wall, a pair of cylindrical and flanged metal sealing elements having cooperating contacting surfaces which lie generally in a plane perpendicular to the axis of rotation of one of said parts, a pair of annular elastic sealing elements each having a pair of legs integrally formed therewith and extending in opposite directions therefrom and generally parallel to the central axis of said sealing element with one of said legs forming an inner leg and contacting a corresponding cylindrical portion and with the outer leg contacting a corresponding tapered wall with said elastic sealing elements being so compressed between the rings and housing parts so as to floatingly support said ring elements and to maintain pressure between said contacting surfaces.

7. A generally annular elastic sealing element having two integrally formed legs extending in opposite directions therefrom and generally parallel to the central axis of said sealing element, one of said legs being on the inner periphery and the other leg being on the outer periphery, said legs being relatively hard and the central portion which forms the remainder of said sealing element being relatively soft.

8. The sealing element of claim 7 wherein the legs have a Shore Hardness within the range of from about 90 to about 100 and said body has a Shore Hardness within the range of from about 40 to about 60.

9. The sealing element of claim 7 wherein said legs have a Shore Hardness of about 95 and said body portion has a Shore Hardness of about 50.

10. In a sealing arrangement of the character described a pair of metal flanged ring-shaped elements having abutting smooth surfaces to provide a running fit therebetween and a pair of elastic generally annular sealing elements each having two leg portions extending in opposite directions therefrom and generally parallel to the central axis of said sealing element, one of said leg portions being on the inner periphery and the other leg being on the outer periphery with the inner leg contacting a corresponding one of said sealing rings for maintaining pressure between said contacting surfaces, said leg portions being relatively hard and the central portion which forms the remainder of the annular sealing elements being relatively soft.

11. In a sealing structure of the character described a pair of housing parts separated by a gap which is desired to be sealed, each of said housing parts being provided with a recessed portion being defined by an inwardly extending tapered wall, a pair of cylindrical and flanged metal sealing elements having cooperating contacting surfaces which lie generally in a plane perpendicular to the axis of rotation of one of said parts, a pair of annular elastic sealing elements each having a pair of legs integrally formed therewith and extending in opposite directions therefrom and generally parallel to the central axis of said sealing element with one of said legs forming an inner leg and contacting a corresponding cylindrical portion with the outer leg contacting a corresponding tapered wall with said elastic sealing elements being so compressed between the rings and housing parts so as to floatingly support said ring elements and to maintain pressure between said contacting surfaces, said legs being relatively hard and the central portion which forms the remainder of said elastic sealing elements being relatively soft.

12. The structure of claim 11 wherein said legs have a Shore Hardness within the range of from about 90 to about 100 and said central portion has a Shore Hardness within the range of from about 40 to about 60.

13. The structure of claim 11 wherein said legs have a Shore Hardness of about 95 and said central portion has a Shore Hardness of about 50.

14. A generally annular sealing element formed of resilient material and having a shape in cross-section comprising a mid-section of complex curved shape having an outer curved surface, said outer curved surface being a circular arc of about 180° having its ends diametrically opposed about a diameter slanted at about 45°; an outside leg projecting outward in a first axial direction from said mid-section adjacent but spaced inward from the outer periphery of said outer curved surface; an inner leg projecting outward in a second axial direction opposite said first axial direction from the said mid-section, said legs generally parallel to the central axis of said sealing element; said cross-section having a relatively deep first cleft extending inward of said mid-section from the underside of said outside leg and a second cleft of lesser depth than said first cleft extending inward of said mid-section from the outside of said inner leg and stiffening means adjacent the outer end of said legs, providing for radially inward and outward deformation of said mid-section upon axial compression of said sealing element.

15. The sealing element of claim 14, in which said stiffening means comprises hard peripheral portions in the outer axial ends of each of said legs, said hard peripheral portions imparting stiffness to said legs, said outer ends of said legs being substantially harder than said mid-section.

References Cited by the Examiner
UNITED STATES PATENTS

| 2,590,759 | 3/52 | Dale et al. | 277—92 |
| 2,867,463 | 1/59 | Snider | 277—225 |
| 2,968,516 | 1/61 | Jarvis | 277—227 XR |
| 3,086,782 | 4/63 | Peickii et al. | 277—96 XR |

FOREIGN PATENTS

| 1,255,283 | 1/61 | France. |
| 1,269,723 | 7/61 | France. |
| 1,101,071 | 3/61 | Germany. |
| 539,005 | 8/41 | Great Britain. |

LEWIS J. LENNY, *Primary Examiner.*

EDWARD V. BENHAM, *Examiner.*